(12) United States Patent
Uehigashi

(10) Patent No.: US 7,474,833 B2
(45) Date of Patent: Jan. 6, 2009

(54) MOVING IMAGE REPRODUCING APPARATUS AND MOVING IMAGE REPRODUCING METHOD

(75) Inventor: Naoya Uehigashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 723 days.

(21) Appl. No.: 10/900,243

(22) Filed: Jul. 27, 2004

(65) Prior Publication Data
US 2005/0025457 A1    Feb. 3, 2005

(30) Foreign Application Priority Data
Jul. 29, 2003    (JP)    ............ P. 2003-281523

(51) Int. Cl.
*H04N 5/91*    (2006.01)
*H04N 5/00*    (2006.01)

(52) U.S. Cl. ............ 386/94; 386/125; 386/126
(58) Field of Classification Search .......... 386/94, 386/125–126
See application file for complete search history.

(56) References Cited
U.S. PATENT DOCUMENTS
2001/0037459 A1 * 11/2001 Ogawa et al. ......... 713/200
2003/0014751 A1 * 1/2003 Paek ................ 725/30

FOREIGN PATENT DOCUMENTS
JP    2001-186478    *    2/1999
JP    2001-186478        7/2001
JP    2002-112181        4/2002

OTHER PUBLICATIONS
Office Action for Japanese Application No. 2003-281523, mailed on Feb. 23, 2007, and English translation thereof (4 pages).

* cited by examiner

*Primary Examiner*—Thai Tran
*Assistant Examiner*—Daquan Zhao
(74) *Attorney, Agent, or Firm*—Osha • Liang LLP

(57) ABSTRACT

A moving image reproducing apparatus for reproducing a moving image recorded on an optical disk includes a storage unit which stores a reproduction permissible level set with respect to a parental level and stores a reference level, a moving image reproducing unit which restricts reproduction of the moving image based on the reproduction permissible level, and a control unit which changes the reproduction permissible level. Preferably, when the reproduction permissible level is instructed to change to a level with restriction easier than the reference level and easier than the present reproduction permissible level, or when the reference level is instructed to change, the control unit requests to input a password, and when a particular input is done with respect to a body, the control unit changes the reproduction permissible level to a level with the hardest restriction.

16 Claims, 3 Drawing Sheets

MOVING IMAGE REPRODUCING APPARATUS AND MOVING IMAGE REPRODUCING METHOD

BACKGROUND OF THE INVENTION

1. Field of the Invention

The present invention relates to a moving image reproducing apparatus capable of easily changing a parental level in the case of being at a level with restriction harder than a reference level.

2. Description of the Related Art

Video software recorded on a DVD (optical disk) includes an extreme violent scene or a love scene, etc. and these scenes may be unfavorable for education of children. Thus, in a DVD player or the video software recorded on the DVD, there was conventionally means for providing a function of restricting video reproduced according to age of a viewer. That is, in a DVD on which the video software is recorded, there was a DVD in which a parental level (viewing age restriction level) is preset every scene (chapter) according to contents of software. Also, in a DVD player, there was means for providing a parental locking function capable of controlling reproduction of video software every scene by cutting a scene which does not desire to be shown to a child and shifting to the next scene or exchanging for another scene based on a parental level preset in the video software and a reproduction permissible level of a parental level preset by a manager of the apparatus at the time of reproducing video software recorded on a DVD.

In the DVD player in which the parental locking function is provided, a parental level can be switched to eight levels from a level 1 to a level 8 in order to cope with systems of all the countries of the world. For example, in the United States of America, setting of the parental level is associated with a rating system. That is, a parental level 7 is set to a level at which viewing of persons 17 years old and less is not admitted (NC-17: No One 17 And Under Admitted). Also, a parental level 3 is set to a level at which guidance is required from a guardian to a child (PG: Parental Guidance Suggested) since the contents which may be improper to a small child are included. Further, a parental level 1 is set to a level recommended to general viewing audiences (G: General Audiences).

Therefore, when a DVD in which a parental level is set is reproduced in the DVD player having the parental locking function, reproduction could be performed while automatically cutting a scene which does not desire to be shown to a child even for software of an adult movie etc.

Also, in the conventional DVD player, at the time of changing a parental level, an input of a password was normally required so as not to easily change setting of a parental level. Also, a disk reproducing apparatus in which a parental level can be changed individually by inputting ID and a password at the time of viewing video software and an input of a master password of a manager is required at the time of setting or changing a parental level has been proposed (See, for example, JP-A-2002-112181, Pages 3 to 5, FIGS. 1 to 5.).

SUMMARY OF THE INVENTION

In the conventional DVD player, at the time of changing a parental level, a password must be inputted, so that there was a problem that the parental level cannot be changed speedily. For example, when a guardian views DVD video together with a child in a state in which a parental level is set to a level 7, a violent scene etc. which do not desire to be shown to the child are reproduced as they are. As a result of that, the guardian must speedily input a password in order to change a reproduction permissible level of the parental level to a level such as a level 1 or a level 3 with hard restriction.

Also, when the parental level is returned to the original level after the parental level is changed to a level with hard restriction, there was a problem that the parental level cannot be changed speedily. For example, when a guardian views another DVD video alone after a parental level is changed to a level with hard restriction in order to view DVD video together with a child, the guardian cannot change the parental level to the original level with easy restriction unless a password is inputted.

Thus, in the conventional disk reproducing apparatus, a password must be inputted every time a parental level is changed, and there was a problem that the parental level cannot be changed speedily.

Therefore, in order to solve the problem, an object of the invention is to provide a moving image reproducing apparatus capable of speedily changing a parental level in the case of being at a level with restriction harder than a reference level.

According to an aspect of the present invention, a moving image reproducing apparatus for reproducing a moving image recorded on an optical disk includes a storage unit which stores a reproduction permissible level set with respect to a parental level, a moving image reproducing unit which restricts reproduction of the moving image based on the reproduction permissible level, and a control unit which changes the reproduction permissible level. Preferably, the storage unit further stores a reference level, when a first instruction to change the reproduction permissible level to a level with restriction harder than the reference level is issued the control unit changes the reproduction permissible level according to the first instruction, when a second instruction to change the reproduction permissible level to a level with restriction easier than the reference level the control unit requests to input a password and when the password is inputted the control unit changes the reproduction permissible level according to the second instruction, when a third instruction to change the reproduction permissible level to a level with restriction harder than the present reproduction permissible level and with restriction easier than the reference level is issued the control unit changes the reproduction permissible level according to the third instruction, when a fourth instruction to change the reference level is issued the control unit requests to input a password and when the password is inputted the control unit changes the reference level according to the fourth instruction, and when a particular input is done with respect to a body the control unit changes the reproduction permissible level to a level with the hardest restriction.

In this configuration, a reproduction permissible level of a parental level which is a level for restricting reproduction of a moving image recorded on an optical disk can be changed to a level with restriction harder than a reference level without inputting a password. Therefore, for example, when a scene which does not desire to be viewed to a child is reproduced while a guardian views a moving image together with the child in a state in which the reproduction permissible level of the parental level is set to the reference level, this reproduction permissible level can speedily be changed to a level with hard restriction. Also, when only the guardian views a moving image after the reproduction permissible level is changed to the level with hard restriction, the reproduction permissible level can speedily be returned to the reference level.

In this configuration, in the case of changing a reproduction permissible level to a level with restriction harder than the present level even when a password is inputted and the reproduction permissible level is changed to a level with restriction easier than a reference level, an input of a password is not required. Therefore, for example, in the case of reproducing a scene which does not desire to be viewed to a child even when a guardian views a moving image together with the child while forgetting that the reproduction permissible level has been changed to the level with restriction easier than the reference level, a restriction level of the reproduction permissible level can speedily be made hard.

In this configuration, an input of a password is always required when a reference level is changed. Therefore, for example, a child can be prevented from changing the reference level at liberty when a guardian manages the password.

In this configuration, a reproduction permissible level of a parental level can be changed to a level with the hardest restriction without an input of a password. In a moving image reproducing apparatus, when the reproduction permissible level is set to the level with the hardest restriction, reproduction of a scene which does not desire to be shown to a child can be prevented surely, so that, for example, when a scene which does not desire to be shown to the child is reproduced while a guardian views a moving image together with the child, reproduction of its scene can be stopped speedily.

According to another aspect of the present invention, a moving image reproducing apparatus for reproducing a moving image recorded on an optical disk including a storage unit which stores a reproduction permissible level set with respect to a parental level, a moving image reproducing unit which restricts reproduction of the moving image based on the reproduction permissible level, and a control unit which changes the reproduction permissible level. Preferably, when a first instruction to change the reproduction permissible level to a level with restriction harder than the present reproduction permissible level is issued the control unit changes the reproduction permissible level according to the first instruction, and when a second instruction to change the reproduction permissible level to a level with restriction easier than the present reproduction permissible level the control unit requests to input a password and when the password is inputted the control unit changes the reproduction permissible level according to the second instruction.

In this configuration, when a parental level is changed to a level with restriction easier than a reproduction permissible level at that point in time, an input of a password is required, but when the parental level is changed to a level with restriction harder than the reproduction permissible level at that point in time, an input of a password is not required. As a result of this, a change can speedily be made when the reproduction permissible level of the parental level is changed to a level with hard restriction.

According to yet another aspect of the present invention, a moving image reproducing apparatus for reproducing a moving image recorded on an optical disk including a storage unit which stores a reproduction permissible level set with respect to a parental level, a moving image reproducing unit which restricts reproduction of the moving image based on the reproduction permissible level, and a control unit which changes the reproduction permissible level. Preferably, the storage unit further stores a reference level, when a first instruction to change the reproduction permissible level to a level with restriction harder than the reference level is issued the control unit changes the reproduction permissible level according to the first instruction, and when a second instruction to change the reproduction permissible level to a level with restriction easier than the reference level the control unit requests to process an authentication and when the authentication is processed the control unit changes the reproduction permissible level according to the second instruction.

According to yet another aspect of the present invention, a moving image reproducing method for reproducing a moving image recorded on an optical disk including storing a reproduction permissible level set with respect to a parental level, and a reference level, when a first instruction to change the reproduction permissible level to a level with restriction harder than the reference level is issued changing the reproduction permissible level according to the first instruction, when a second instruction to change the reproduction permissible level to a level with restriction easier than the reference level requesting to input a password and when the password is inputted changing the reproduction permissible level according to the second instruction, when a third instruction to change the reproduction permissible level to a level with restriction harder than the present reproduction permissible level and with restriction easier than the reference level is issued changing the reproduction permissible level according to the third instruction, when a fourth instruction to change the reference level is issued requesting to input a password and when the password is inputted changing the reference level according to the fourth instruction, when a particular input is done with respect to a body changing the reproduction permissible level to a level with the hardest restriction, and restricting reproduction of the moving image based on the reproduction permissible level.

According to the invention, when a parental level is changed to a level with restriction harder than that of a level set at present, the parental level can be changed speedily without an input of a password. Also, by operating level sudden change unit, the parental level can be changed to a level with the hardest restriction without an input of a password.

BRIEF DESCRIPTION OF THE DRAWINGS

Preferred embodiment of the present invention will be described in detail based on the following figures, wherein.

DETAILED DESCRIPTION OF THE INVENTION

Figure 1:
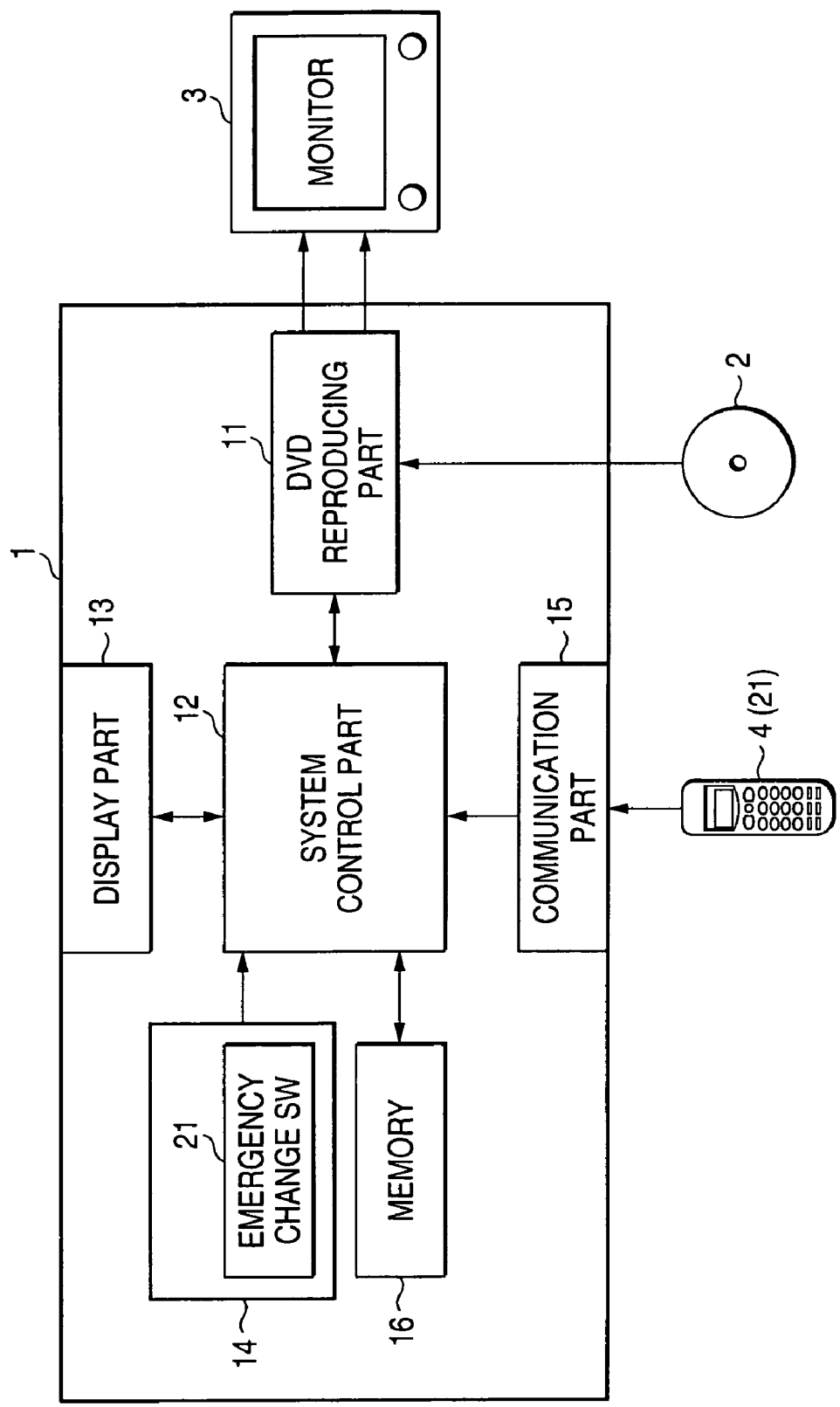
FIG. 1 is a configuration diagram showing an outline of a moving image reproducing apparatus according to an embodiment of the invention.

FIG. 1 is a configuration diagram showing an outline of a moving image reproducing apparatus according to an embodiment of the invention. A DVD player 1 which is the moving image reproducing apparatus reproduces a DVD 2 which is an optical disk, and outputs a video signal and an audio signal to a monitor 3. Also, the DVD player 1 can control an action by a remote control device 4. Here, the DVD player 1 can also be configured so that parental levels can be set respectively with respect to plural users as shown in a disk reproducing apparatus described in JP-A-2002-112181. However, in order to simplify description in the following description, description will be made as the case that only a password of a manager (guardian) can be set in the DVD player 1.

The DVD player 1 comprises a DVD reproducing part 11, a system control part 12, a display part 13, an operation part 14, a communication part 15 and memory 16. The DVD reproducing part 11 applies laser light to a record surface of the DVD 2 which is the optical disk, and reproduces video software (a moving image) recorded on the DVD 2, and outputs a video signal and an audio signal to the monitor 3.

The system control part 12 controls an action of each the part of the DVD player 1 and also reads a reproduction permissible level of a parental level out of the memory 16, and performs control of selection and switching, etc. of a chapter reproduced by the DVD reproducing part 11 based on this reproduction permissible level.

The display part 13 displays information about a chapter or information about video software during reproduction. Also, the contents necessary to notify a viewing audience are displayed.

The operation part 14 accepts various operations of the DVD player 1 performed by a viewing audience, and outputs a signal corresponding to the operation to the system control part 12. For example, the operation part 14 accepts operations of instructions of reproduction and stop of the DVD 2 or instructions of a change of a parental level or an input of a password and so on.

The communication part 15 is a unit for receiving an operation signal sent from the remote control device 4 and transmitting this operation signal to the system control part 12.

Various setting etc. inputted from the operation part 14 are stored in the memory 16. Also, a reference level or a reproduction permissible level of a parental level set by a viewing audience is stored in the memory 16.

Here, the reproduction permissible level of the parental level is a threshold value for restricting a parental level at the time of reproducing video software recorded on the DVD by the DVD player 1. That is, in the DVD player 1, when a parental level set in each chapter of video software recorded on the DVD 2 is the same parental level or a parental level with restriction harder than the reproduction permissible level, its chapter is reproduced. On the other hand, when the parental level set in each the chapter of the video software recorded on the DVD 2 is a level with restriction easier than the reproduction permissible level of the parental level, its chapter is not reproduced or an alternative chapter is reproduced.

Also, the reference level of the parental level is a threshold value for determining the presence or absence of an input of a password at the time of changing a parental level. That is, in the case of making a change to a reproduction permissible level with restriction harder than the reference level of the parental level at the time of changing the parental level, the DVD player 1 does not require an input of a password. On the other hand, in the case of making a change to a level with restriction easier than the reference level of the parental level at the time of changing the reproduction permissible level of the parental level, the DVD player 1 requires an input of a password. In the DVD player 1, the reference level of the parental level can be changed by inputting a password preset.

Next, an action of the DVD player 1 will be described. When the DVD 2 is set in a disk tray (not shown) and a reproduction operation of video software recorded on the DVD 2 is performed by the operation part 14 or the remote control device 4, the DVD player 1 checks whether or not a parental level is set in the video software recorded on the DVD 2. When the parental level is not set in the DVD 2, the DVD player 1 reproduces a moving image as it is without imposing restriction, and outputs video and audio data to the monitor 3.

On the other hand, when the parental level is set in the DVD 2, the DVD player 1 reads a reproduction permissible level of a parental level used as a setting value for restricting reproduction of a moving image recorded on the DVD 2 out of the memory 16. Then, reproduction of a chapter is controlled based on the reproduction permissible level of the parental level read out of the memory 16 and the parental level set in the video software recorded on the DVD 2.

In the DVD player 1, the reproduction permissible level of the parental level can be changed to an arbitrary level in the case of being in the range from the reference level of the parental level to a parental level (level 1) with the hardest restriction. On the other hand, in the DVD player 1, in the case of being in the range from a level with restriction easier than the reference level of the parental level to a parental level (level 8) with the easiest restriction, an input of a password is required at the time of changing the reproduction permissible level of the parental level. Also, in the DVD player 1, when the reproduction permissible level of the parental level is changed to a level with hard restriction even in the case that the reproduction permissible level is set to a level with restriction easier than the reference level of the parental level, an input of a password is not required.

For example, in the case that the present reproduction permissible level and the reference level of the parental level are set to a level 4, when the DVD player 1 detects that an operation for changing the reproduction permissible level to a level in the range from a level 1 to a level 4 has been performed in the operation part 14, the reproduction permissible level is changed without requesting an input of a password. On the other hand, when the DVD player 1 detects that an operation for changing the reproduction permissible level to a level in the range from a level 5 to a level 8 has been performed in the operation part 14, an input of a password is requested and when the password is not inputted, a change of the reproduction permissible level is not permitted. Also, in the case that the reference level of the parental level is set to a level 4 and the present reproduction permissible level is set to a level 7, when the DVD player 1 detects that an operation for changing the reproduction permissible level to a level in the range from a level 1 to a level 6 has been performed in the operation part 14, the reproduction permissible level is changed without requesting an input of a password.

The DVD player 1 can set the reproduction permissible level of the parental level as described above, so that useful effect can be obtained in the following situation. For example, when a scene which does not desire to be shown to a child is reproduced while a guardian and the child view video software recorded on the DVD in a state in which the reproduction permissible level of the parental level of the DVD player 1 is set to a level 4 which is the reference level, an input of a password is not required, so that the guardian operates the operation part 14 or the remote control device 4 and speedily changes the reproduction permissible level of the parental level from the level 4 to a level (for example, a level 2) with harder restriction and can change this scene to another scene. Also, when a guardian returns the reproduction permissible level of the parental level to the original level in order to view the video software recorded on this DVD alone after the reproduction permissible level of the parental level is changed to a level 2, the reproduction permissible level can be changed speedily without an input of a password. Further, even when a child attempts to view a DVD by changing setting of the parental level to a level with restriction easier than the reference level in the case that a guardian is absent etc., an input of a password is required, so that the reproduction permissible level can be prevented from being changed at liberty. In addition, even when a guardian has inputted a password and has changed the reproduction permissible level of the parental level to a level with easy restriction, the reproduction permissible level of the parental level can speedily be changed to a level with hard restriction by operating the operation part 14.

Also, the operation part 14 and the remote control device 4 of the DVD player 1 of the invention comprise an emergency change switch 21 for changing the reproduction permissible level of the parental level set at present to a level 1 which is a level with the hardest restriction. A viewing audience can speedily change the reproduction permissible level of the parental level to the level 1 which is the level with the hardest restriction by operating the emergency change switch 21 during viewing of DVD video etc. By setting the DVD player 1 as described above, useful effect can be obtained in the following situation. For example, in the DVD player 1 in which the reproduction permissible level and the reference level of the parental level are set to a level 4, a scene such as a violent scene unfavorable for a child may be reproduced while a guardian views DVD video in which the parental level is set together with a child. In such a case, the guardian can speedily change the parental level to the level 1 which is the level with the hardest restriction by operating the emergency change switch 21, so that the scene unfavorable for the child can be changed to another scene at once. Here, the reason why the parental level is changed to the level with the hardest restriction when the emergency change switch 21 is operated is because changing the parental level to the level 1 is most effective in surely stopping reproduction of a scene which does not desire to be shown to the child regardless of age of the child.

Incidentally, setting of the emergency change switch 21 is made so that the parental level is switched to the level with the hardest restriction as described above, but a manager (guardian) can change setting of a level to which the parental level is switched at the time of operation of the emergency change switch 21 by inputting a password. For example, setting can be changed so that the reproduction permissible level of the parental level is switched to a level 2 or a level 3, etc. when the emergency change switch 21 is operated. As a result of this, the guardian can speedily change the parental level to a level according to age of a child by operating the emergency change switch 21.

Also, in the case of being in the range to the reference level even when the emergency change switch 21 is operated to change the parental level, a viewing audience can change the parental level to a level with easy restriction without an input of a password. Therefore, as shown in the example described above, when viewing of a DVD is continued by only a guardian after the emergency change switch 21 is operated to change the reproduction permissible level from a level 4 to a level 1, the guardian can easily change the parental level to the level 4 which is the original reproduction permissible level.

Figure 2:
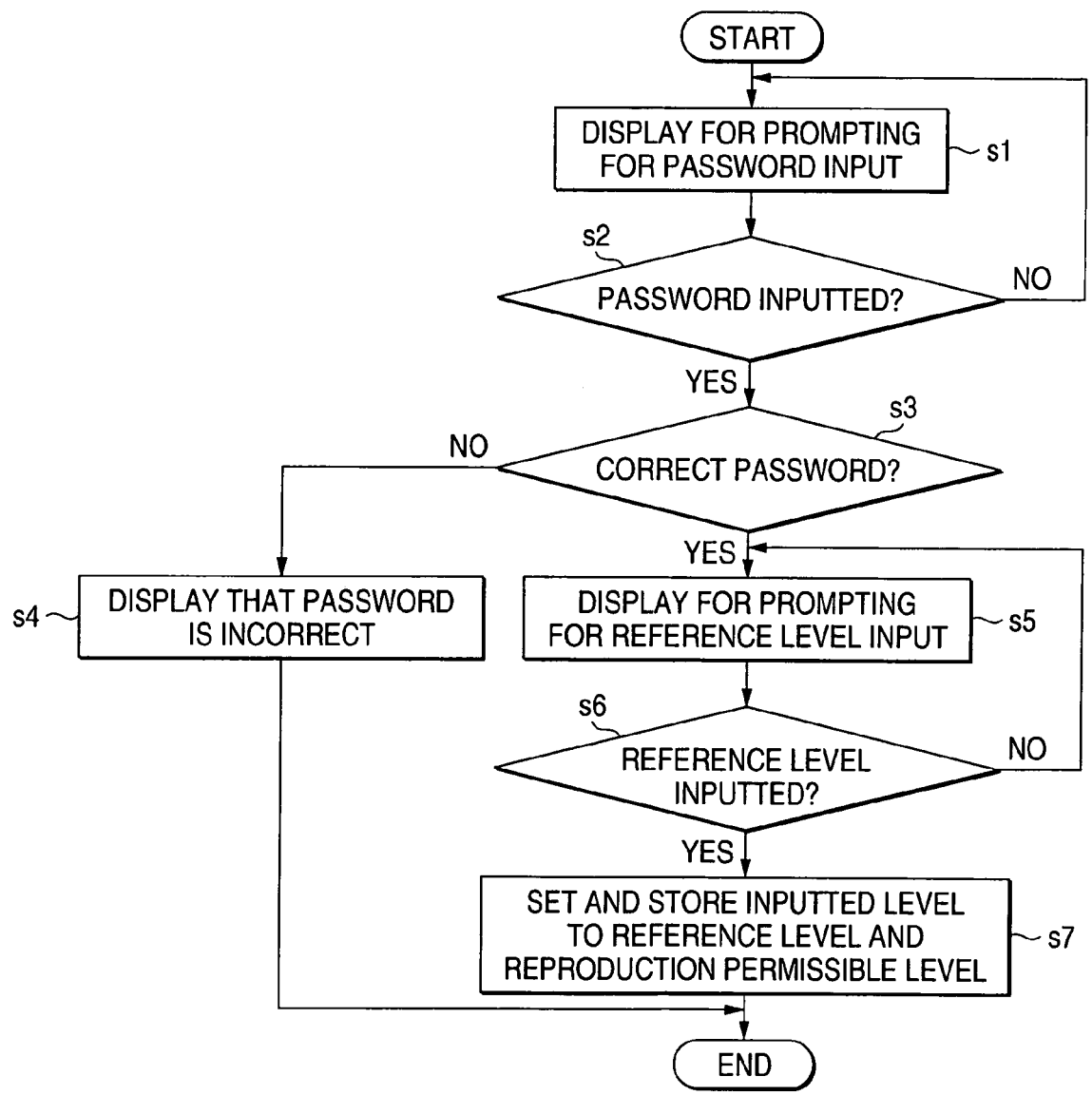
FIG. 2 is a flowchart describing a setting action of a reference level of a parental level in a DVD player according to the embodiment of the invention.

Next, a setting action of the reproduction permissible level and the reference level of the parental level in the DVD player 1 will be described based on a flowchart. FIG. 2 is a flowchart describing a setting action of the reference level of the parental level in the DVD player according to the embodiment of the invention. Incidentally, in the DVD player 1, a password shall be preset by a manager.

First, when the operation part 14 of the DVD player 1 is operated and a mode of setting a reference level of a parental level is selected, the system control part 12 performs display for prompting for an input of a password on the display part 13 (s1). Then, the system control part 12 waits until the password is inputted. When the system control part 12 detects that the password is inputted from the operation part 14 (s2), a password stored in the memory 16 is read out and the password inputted from the operation part 14 is checked (s3).

When the inputted password is incorrect, the system control part 12 performs display to the effect that the password is incorrect on the display part 13 (s4), and the processing is ended.

On the other hand, when the inputted password is correct in step s3, the system control part 12 performs display for prompting for setting of the reference level of the parental level on the display part 13 (s5), and waits until an input is done from the operation part 14. When the system control part 12 detects that the reference level is inputted from the operation part 14 (s6), the reference level inputted from the operation part 14 is stored in the memory 16. Also, the system control part 12 sets the of the parental level to the reproduction permissible level and stores the reference level in the memory 16 (s7), and the processing is ended.

Figure 3:
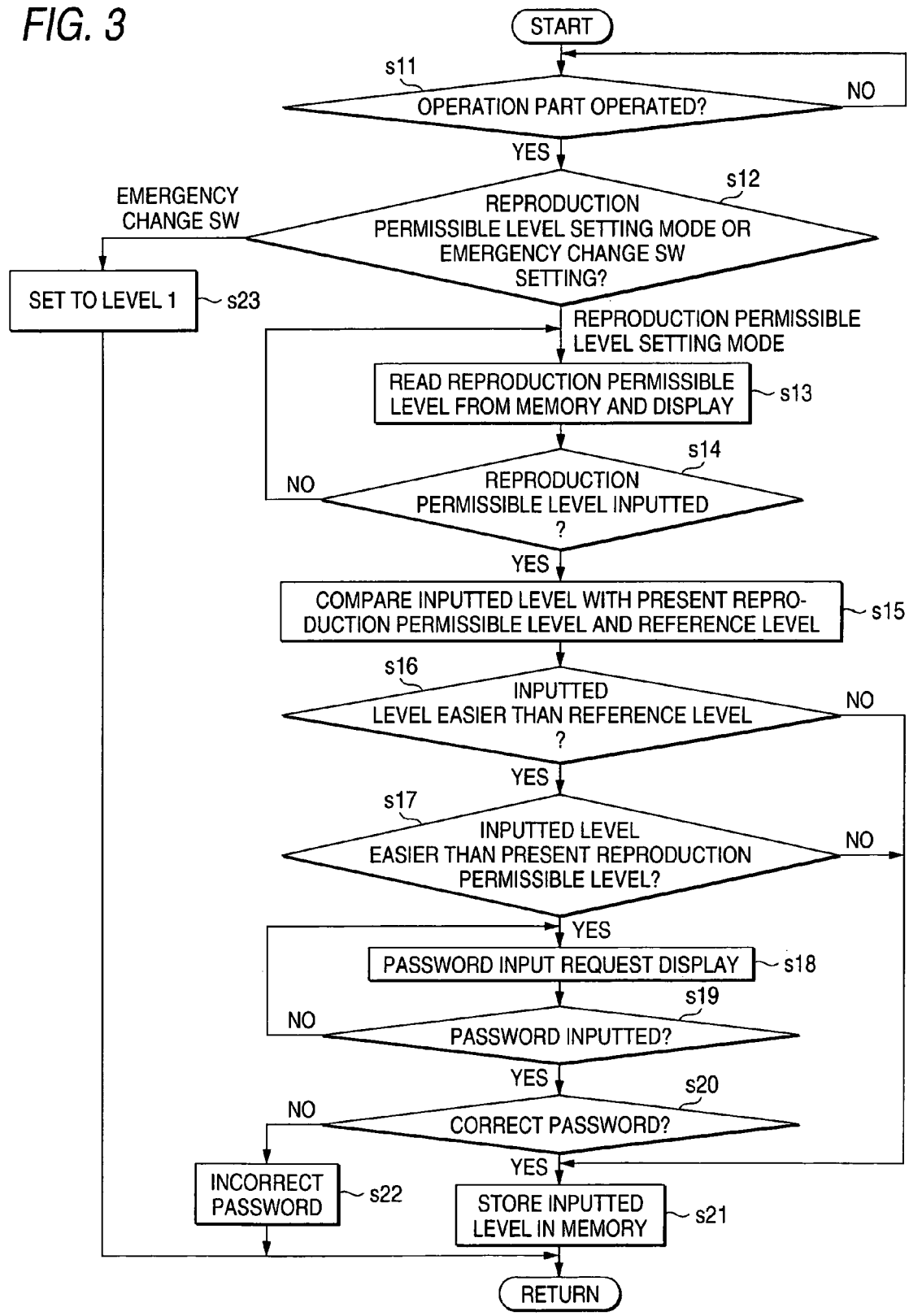
FIG. 3 is a flowchart describing a setting action of a reproduction permissible level of a parental level in the DVD player according to the embodiment of the invention.

Subsequently, a setting action of the reproduction permissible level of the parental level in the DVD player 1 will be described. FIG. 3 is a flowchart describing a setting action of the reproduction permissible level of the parental level in the DVD player according to the embodiment of the invention. When the operation part 14 of the DVD player 1 is operated (s11) and a mode of setting a reproduction permissible level of a parental level is selected (s12), the system control part 12 reads the present reproduction permissible level of the parental level out of the memory 16 and displays the reproduction permissible level on the display part 13 (s13). Then, the system control part 12 waits until the reproduction permissible level of the parental level is inputted. When the system control part 12 detects that the reproduction permissible level is inputted from the operation part 14 (s14), the inputted reproduction permissible level is compared with the present reproduction permissible level of the parental level and the reference level of the parental level (s15). When the reproduction permissible level inputted from the operation part 14 is a level with restriction harder than the reference level of the parental level (s16), the system control part 12 stores the level inputted from the operation part 14 as the present reproduction permissible level in the memory 16 (s21). Then, the processing is ended.

Also, when the reproduction permissible level inputted from the operation part 14 is a level with restriction easier than the reference level of the parental level (s16) and is a level with restriction harder than the present reproduction permissible level of the parental level (s17), the system control part 12 stores the level inputted from the operation part 14 as the present reproduction permissible level in the memory 16 (s21). Then, the processing is ended.

On the other hand, when the reproduction permissible level inputted from the operation part 14 is a level with restriction easier than the reference level of the parental level (s16) and is a level with restriction easier than the present reproduction permissible level of the parental level (s17), the system control part 12 performs display for prompting for an input of a password on the display part 13 (s18). Then, the system control part 12 waits until the password is inputted from the operation part 14. When the system control part 12 detects that the password is inputted from the operation part 14 (s19), a password stored in the memory 16 is read out and the password inputted from the operation part 14 is checked (s20). When the password inputted from the operation part 14 is different from the password stored in the memory 16, the control part 12 performs display to the effect that the reproduction permissible level of the parental level cannot be changed since the password is incorrect on the display part 13 (s22), and the processing is ended.

On the other hand, when the password inputted from the operation part 14 is correct, the system control part 12 stores the reproduction permissible level previously inputted from the operation part 14 as the reproduction permissible level of the present parental level in the memory 16 (s21), and the processing is ended.

Also, when system control part 12 detects that the emergency change switch 21 of the operation part 14 is operated in step s12, the reproduction permissible level of the parental level is set to a level 1 (s23), and the processing is ended.

Incidentally, in the DVD player 1, setting processing of the reproduction permissible level of the parental level described based on FIG. 3 can be performed regardless of whether or not the DVD 2 is being reproduced.

Also, in the DVD player 1, the reference level is not provided and when restriction of the reproduction permissible level of the parental level inputted is harder than that of the reproduction permissible level of the parental level set at present, setting could be made so that a change can be made without an input of a password. Also, when restriction of the reproduction permissible level of the parental level inputted is easier than that of the reproduction permissible level of the parental level set at present, setting could be made so that a change cannot be made without an input of a password. As a result of this, a change can be made speedily when the reproduction permissible level of the parental level is changed to a level with hard restriction. Also, a child can be prevented from changing the reproduction permissible level to a level with easy restriction at liberty during absence of a guardian etc.

As described above, according to the invention, when a reproduction permissible level of a parental level is changed to a level with restriction harder than that of a level set at present, the parental level can be changed speedily without an input of a password. Also, by operating an emergency change switch etc. and doing a particular input to a body, a change can be made so as to reproduce a moving image of a level with the hardest restriction by speedily changing the parental level to a level with the hardest restriction without an input of a password.

What is claimed is:

1. A moving image reproducing apparatus for reproducing a moving image recorded on an optical disk, comprising:
    a storage unit which stores a reproduction permissible level set with respect to a parental level;
    a moving image reproducing unit which restricts reproduction of the moving image based on the reproduction permissible level; and
    a control unit which changes the reproduction permissible level,
    wherein
    the storage unit further stores a reference level, when a first instruction to change the reproduction permissible level to a level with restriction harder than the reference level is issued, the control unit changes the reproduction permissible level according to the first instruction without requesting to input a password,
    when a second instruction to change the reproduction permissible level to a level with restriction easier than the reference level is issued, the control unit requests to input the password, and only when the password is inputted, the control unit changes the reproduction permissible level according to the second instruction,
    when a third instruction to change the reproduction permissible level to a level with restriction harder than the present reproduction permissible level and with restriction easier than the reference level is issued, the control unit changes the reproduction permissible level according to the third instruction without requesting to input the password,
    when a fourth instruction to change the reference level is issued, the control unit requests to input a password, and only when the password is inputted, the control unit changes the reference level according to the fourth instruction,
    when a fifth instruction to change the reproduction permissible level to a level with the hardest restriction is issued, the control unit changes the reproduction permissible level according to the fifth instruction, and
    when an emergency instruction to change the reproduction permissible level to a predetermined level is issued, the control unit changes the reproduction permissible level according to the emergency instruction, wherein the predetermined level is adjustable by a user.

2. The moving image reproducing apparatus as claimed in claim 1, wherein when a return instruction is issued, the control unit changes the reproduction permissible level to an original level that is the reproduction permissible level before the emergency instruction is issued without requesting to input a password.

3. A moving image reproducing apparatus for reproducing a moving image recorded on an optical disk, comprising:
    a storage unit which stores a reproduction permissible level set with respect to a parental level;
    a moving image reproducing unit which restricts reproduction of the moving image based on the reproduction permissible level; and
    a control unit which changes the reproduction permissible level,
    wherein
    the storage unit further stores a reference level,
    when a first instruction to change the reproduction permissible level to a level with restriction harder than the reference level is issued, the control unit changes the reproduction permissible level according to the first instruction without requesting to process an authentication,
    when a second instruction to change the reproduction permissible level to a level with restriction easier than the reference level, the control unit requests to process the authentication, and only when the authentication is processed, the control unit changes the reproduction permissible level according to the second instruction,
    when a third instruction to change the reproduction permissible level to a level with the hardest restriction is issued, the control unit changes the reproduction permissible level according to the third instruction, and
    when an emergency instruction to change the reproduction permissible level to a predetermined level is issued, the control unit changes the reproduction permissible level according to the emergency instruction, wherein the predetermined level is adjustable by a user.

4. The moving image reproducing apparatus as claimed in claim 3, wherein the authentication includes a password authentication.

5. The moving image reproducing apparatus as claimed in claim 4, wherein
    when a fourth instruction to change the reference level is issued, the control unit requests to input a password, and only when the password is inputted, the control unit changes the reference level according to the fourth instruction.

6. The moving image reproducing apparatus as claimed in claim 5, wherein when a return instruction is issued, the control unit changes the reproduction permissible level to an original level that is the reproduction permissible level before the third instruction is issued without requesting to input a password.

7. The moving image reproducing apparatus as claimed in claim 4, wherein when a return instruction is issued, the control unit changes the reproduction permissible level to an original level that is the reproduction permissible level before the third instruction is issued without requesting to input a password.

8. The moving image reproducing apparatus as claimed in claim 3, wherein
when a fourth instruction to change the reproduction permissible level to a level with restriction harder than the present reproduction permissible level and with restriction easier than the reference level is issued, the control unit changes the reproduction permissible level according to the fourth instruction without requesting to process an authentication.

9. The moving image reproducing apparatus as claimed in claim 8, wherein
when a fifth instruction to change the reference level is issued, the control unit requests to input a password, and only when the password is inputted, the control unit changes the reference level according to the fifth instruction.

10. The moving image reproducing apparatus as claimed in claim 9, wherein when a return instruction is issued, the control unit changes the reproduction permissible level to an original level that is the reproduction permissible level before the third instruction is issued without requesting to input a password.

11. The moving image reproducing apparatus as claimed in claim 8, wherein when a return instruction is issued, the control unit changes the reproduction permissible level to an original level that is the reproduction permissible level before the third instruction is issued without requesting to input a password.

12. The moving image reproducing apparatus as claimed in claim 3, wherein when a return instruction is issued, the control unit changes the reproduction permissible level to an original level that is the reproduction permissible level before the third instruction is issued without requesting to input a password.

13. A moving image reproducing apparatus for reproducing a moving image recorded on an optical disk, comprising:
a storage unit which stores a reproduction permissible level set with respect to a parental level;
a moving image reproducing unit which restricts reproduction of the moving image based on the reproduction permissible level; and
a control unit which changes the reproduction permissible level,
wherein
when a first instruction to change the reproduction permissible level to a level with restriction harder than the present reproduction permissible level is issued, the control unit changes the reproduction permissible level according to the first instruction without requesting to input an password,
when a second instruction to change the reproduction permissible level to a level with restriction easier than the present reproduction permissible level is issued, the control unit requests to input the password, and only when the password is inputted, the control unit changes the reproduction permissible level according to the second instruction,
when a third instruction to change the reproduction permissible level to a level with the hardest restriction is issued, the control unit changes the reproduction permissible level according to the third instruction, and
when an emergency instruction to change the reproduction permissible level to a predetermined level is issued, the control unit changes the reproduction permissible level according to the emergency instruction, wherein the predetermined level is adjustable by a user.

14. The moving image reproducing apparatus as claimed in claim 13, wherein when a return instruction is issued, the control. unit changes the reproduction permissible level to an original level that is the reproduction permissible level before the third instruction is issued without requesting to input a password.

15. A moving image reproducing method for reproducing a moving image recorded on an optical disk, comprising:
storing a reproduction permissible level set with respect to a parental level, and a reference level;
when a first instruction to change the reproduction permissible level to a level with restriction harder than the reference level is issued, changing the reproduction permissible level according to the first instruction without requesting to input a password;
when a second instruction to change the reproduction permissible level to a level with restriction easier than the reference level is issued, requesting to input a password, and only when the password is inputted, changing the reproduction permissible level according to the second instruction;
when a third instruction to change the reproduction permissible level to a level with restriction harder than the present reproduction permissible level and with restriction easier than the reference level is issued, changing the reproduction permissible level according to the third instruction without requesting to input the password;
when a fourth instruction to change the reference level is issued, requesting to input a password, and only when the password is inputted, changing the reference level according to the fourth instruction;
when a fifth instruction to change the reproduction permissible level to a level with the hardest restriction is issued, changing the reproduction permissible level according to the fifth instruction;
when an emergency instruction to change the reproduction permissible level to a predetermined level is issued, changing the reproduction permissible level according to the emergency instruction, wherein the predetermined level is adjustable by a user; and
restricting reproduction of the moving image based on the reproduction permissible level.

16. The moving image reproducing method as claimed in claim 15, further comprising when a return instruction is issued, changing the reproduction permissible level to an original level that is the reproduction permissible level before the third instruction is issued without requesting to input a password.

* * * * *